United States Patent
Op De Beeck et al.

(10) Patent No.: US 6,671,388 B1
(45) Date of Patent: Dec. 30, 2003

(54) METHOD AND APPARATUS FOR DETECTING A WATERMARK IN A MANIPULATED IMAGE

(75) Inventors: Marc Joseph Rita Op De Beeck, Eindhoven (NL); Jaap Andre Haitsma, Eindhoven (NL); Antonius Adrianus Cornelis Maria Kalker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 400 days.

(21) Appl. No.: 09/670,006

(22) Filed: Sep. 25, 2000

(30) Foreign Application Priority Data

Sep. 27, 1999 (EP) ............................................. 99203143

(51) Int. Cl.$^7$ ................................................. H04K 1/00
(52) U.S. Cl. ...................................... 382/100; 382/278
(58) Field of Search .............................. 382/100, 232, 382/278, 286, 289, 290, 291, 292, 293, 295, 296, 298, 301; 380/210, 252, 287, 54; 713/176

(56) References Cited

U.S. PATENT DOCUMENTS

| | | | |
|---|---|---|---|
| 5,636,292 A | 6/1997 | Rhoads | 382/232 |
| 5,835,639 A * | 11/1998 | Honsinger et al. | 382/278 |
| 5,949,055 A * | 9/1999 | Fleet et al. | 235/469 |
| 6,229,924 B1 * | 5/2001 | Rhoads et al. | 382/232 |
| 6,438,252 B2 * | 8/2002 | Miller | 382/100 |

FOREIGN PATENT DOCUMENTS

| | | | |
|---|---|---|---|
| EP | 0 903 943 A2 * | 3/1999 | |
| WO | 97/43736 A1 | 11/1997 | G06K/9/36 |

OTHER PUBLICATIONS

Choi et al., "Robust sinusoidal watermark for images," *Electronics Letters*, vol. 35, No. 15, Jul. 22, 1999, pp. 1238–1239.*

Duric et al., "Recovering Watermarks from Images," Information and Software Engineering Technical Report ISE–TR–99–04, George Mason University, Apr. 15, 1999, 22 pages.*

Kutter, "Watermarking resisting to translation, rotation, and scaling," *Proc. SPIE vol. 3528: Multimedia Systems and Applications*, Nov. 1988, pp. 423–431.*

Osborne et al., "Image and Watermark Registration for Monochrome and Coloured Images," *Proc. DICTA '97*, Dec. 1997, pp. 59–64.*

Kalker E.A.: "A Video Watermarking System for Broadcast Monitoring," *Proceedings of the SPIE*, vol. 3657, Jan. 25–27, 1999, p. 103–112.

Maes M et al: "Exploiting Shift Invariance to Obtain a High Payload in Digital Image Watermarking," *Proceedings of the International Conference on Multimedia Computing and Systems*, Jun. 1999, pp. 9–12.

* cited by examiner

Primary Examiner—Andrew W. Johns
(74) Attorney, Agent, or Firm—Edward W. Goodman

(57) ABSTRACT

Most watermarking schemes are not resistant to geometric distortions of a watermarked image, because such manipulations destroy the correlation between the original watermark and the watermark in the manipulated image. In order to restore the correlation, a suspect image (Q) is analyzed (6) for the presence of a repeated data pattern. If such a pattern is found, it is concluded that the image has been watermarked by "tiling" a small-sized watermark pattern over the extent of the image. The actual detection of whether the watermark is a given watermark W is subsequently performed by determining the periodicity of the pattern found in the suspect image, and processing (9) the suspect image so as to match the periodicity of the processed image with the given periodicity of the watermark to be detected. If the suspect image indeed includes the given watermark W, the geometric manipulation is thereby undone and a conventional watermark detector (3) will signify this accordingly. If a combination of operations can generate the same periodicity, the detection step will include the set of possible combinations.

4 Claims, 5 Drawing Sheets

METHOD AND APPARATUS FOR DETECTING A WATERMARK IN A MANIPULATED IMAGE

BACKGROUND OF THE INVENTION

1. Field of the Invention

The invention relates to a method and apparatus for detecting a watermark embedded in a suspect image.

2. Description of the Related Art

Watermarking is a technique to certify the ownership of images or video. Usually, the watermark is embedded by adding a specific low-amplitude noisy pattern to the image. The noisy pattern represents the watermark. Whether or not a suspect image has an embedded given watermark is detected at the receiver end by computing the correlation of the suspect image with an applied version of said watermark, and comparing the correlation with a threshold. If the correlation is larger than the threshold, the applied watermark is said to be present, otherwise, it is said to be absent.

Applicant's previously filed International Patent Application IB99/00358 corresponding to U.S. patent application Ser. No. 09/423,276, filed Nov. 4, 1999 (PHN 17.316), discloses an arrangement for detecting a watermark that is embedded by repeating a small-sized basic watermark pattern over the extent of the image. Such a "tiling" operation allows the watermark detection process to search the watermark over a relatively small space, and improves the reliability of detection.

It is known that most watermarking techniques are not resistant to geometric distortions of the image. Manipulations, such as translation, scaling, rotation, or stretching, destroy the correlation between the manipulated image and the applied watermark. The above-mentioned prior-art watermark detector is resistant to translation but lacks the ability of detecting the watermark if the image has been scaled, rotated or stretched.

SUMMARY OF THE INVENTION

It is an object of the invention to provide an improved watermark detection method and apparatus.

To this end, the method of detecting a watermark in a suspect image comprises the steps of detecting whether said suspect image includes a periodically repeated embedded data pattern, and concluding that said periodically repeated data pattern represents an embedded watermark. The invention is based on the recognition that operations, such as scaling, rotating and stretching, change but do not destroy the periodicity of a watermark if said watermark is embedded by means of the above-mentioned "tiling" operation. Accordingly, the mere presence of a periodically repeated data pattern in the suspect image signifies that the image has been watermarked.

Detection as to whether the embedded watermark is a specific given watermark is achieved by processing the suspect image or the given watermark in such a way that the original correlation is restored. This is achieved in an embodiment of the method which comprises the steps of determining the periodicity of said data pattern, applying a given watermark having a given periodicity, processing the suspect image and/or the given watermark so as to match the periodicity of the data pattern in the processed suspect image with the periodicity of the processed given watermark, and detecting whether the data pattern in the processed suspect image corresponds to the processed given watermark. The aim of the step of processing the suspect image is to undo the manipulation (scaling, rotation, stretching) which the suspect image has undergone after it is watermarked.

U.S. Pat. No. 5,636,292 discloses the step of adding a separate calibration signal (e.g., a sine wave with a specified frequency) to the image. When the image is scaled or rotated, the frequency of the sine wave changes, which results in a peak displacement in the image's frequency spectrum. The invention differs from this prior art in that the periodic watermark pattern itself provides the calibration parameters.

These and other aspects of the invention are apparent from and will be elucidated with reference to the embodiments described hereinafter.

DESCRIPTION OF THE PREFERRED EMBODIMENTS

Figure 1:
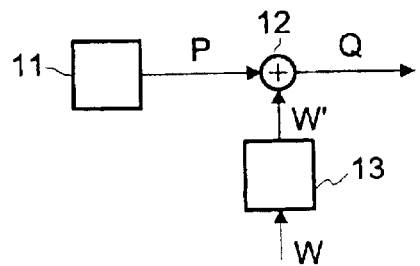
FIG. 1 shows a prior-art watermark embedder.
Figure 2:
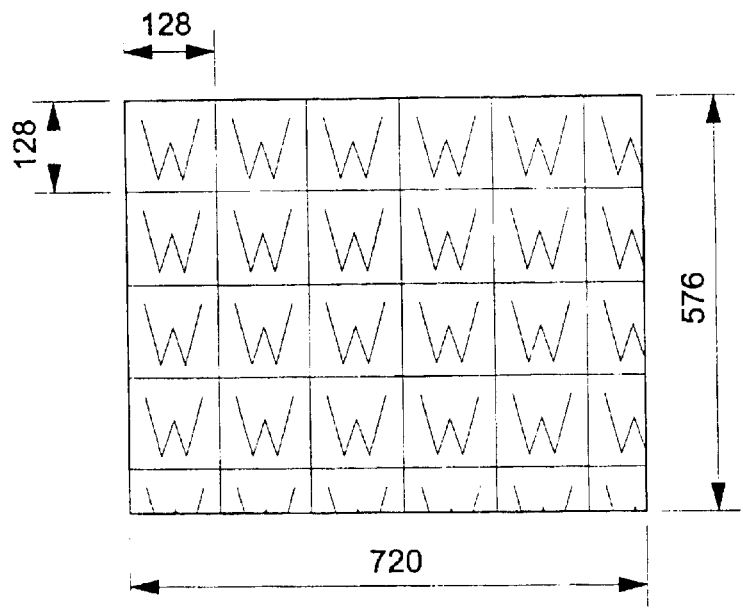
FIG. 2 shows a watermarked image to illustrate the operation of the watermark embedder which is shown in FIG. 1.

In order to provide background information, a prior-art watermark embedder and a prior-art watermark detector are described first. FIG. 1 shows a practical embodiment of a prior-art watermark embedder. The embedder comprises an image source 11, which generates an image P, and an adder 12 which adds a given watermark W' to the image P. The watermark W' is a noise pattern having the same size as the image, e.g., $N_1$ pixels horizontally and $N_2$ pixels vertically (for example, 720×576 for PAL-TV). It is generated by repeating, and if necessary truncating, smaller basic watermark patterns or "tiles" W over the extent of the image. This tiling operation, which is carried out by a tiling circuit 13, is illustrated in FIG. 2. The basic patterns W have a fixed size $M_1 \times M_2$, for example, 128×128 pixels.

Figure 3:
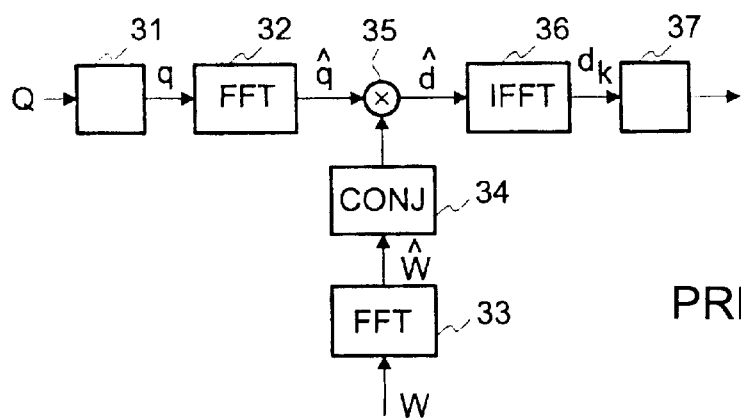
FIG. 3 shows a prior-art watermark detector.
Figure 4:
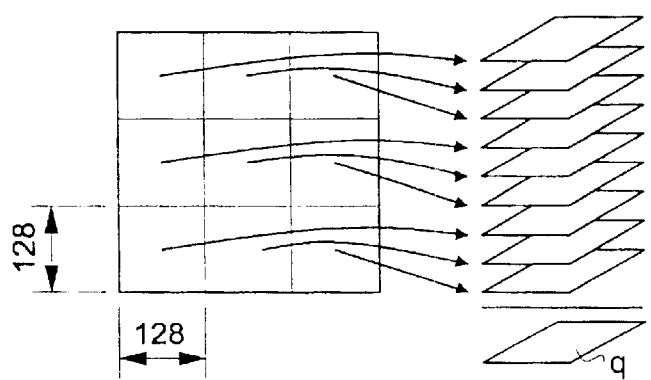
FIG. 4 shows, schematically, an operation carried out by the watermark detector shown in FIG. 3.

FIG. 3 shows a practical embodiment of a prior-art watermark detector. The detector receives possibly watermarked images Q. The image (or a number of accumulated video frames) is partitioned into blocks having the size $M_1 \times M_2$ of the basic watermark pattern W to be detected (here, 128×128). The blocks are then stacked in a buffer q of size $M_1 \times M_2$ as illustrated in FIG. 4. These operations are carried out by a folding and buffer circuit 31.

To detect whether or not the buffer q includes the given watermark pattern W, the buffer contents and said watermark pattern W are subjected to correlation. Computing the correlation of a suspect information signal q with a watermark pattern w comprises computing the inner product d=<q,w> of the information signal values and the corresponding values of the watermark pattern. For the two-dimensional $M_1 \times M_2$ image block $q=\{q_{ij}\}$ and watermark pattern $W=\{w_{ij}\}$, the inner product can be written in mathematical notation as:

$$d = \frac{1}{M_1 M_2} \sum_{i=1}^{M_1} \sum_{j=1}^{M_2} q_{ij} w_{ij}.$$

As the suspect image Q may have undergone manipulations, such as translation or cropping, prior to the watermark detection, the detector does not know the spatial location of the watermark pattern W with respect to the boundaries of image block q. A multiple of correlations $d_k$ must therefore be calculated for all possible shift vectors k ($k_x$ pixels horizontally and $k_y$ pixels vertically):

$$d_k = \frac{1}{M_1 M_2} \sum_{i=1}^{M_1} \sum_{j=1}^{M_2} q_{ij} w_{i+k_x, j+k_y}$$

Said correlation values $d_k$ can be simultaneously computed using the (Fast) Fourier Transform. Both the contents of buffer q and the basic watermark pattern W are subjected to a Fast Fourier Transform (FFT) in transform circuits 32 and 33, respectively. These operations yield:

$\hat{q} = FFT(q)$ and $\hat{w} = FFT(w)$, where $\hat{q}$ and $\hat{w}$ are sets of complex numbers.

Computing the correlation is similar to computing the convolution of q and the conjugate of W. In the transform domain, this corresponds to:

$\hat{d} = \hat{q} \otimes \text{conj}(\hat{w})$ where the symbol $\otimes$ denotes pointwise multiplication and conj( ) denotes inverting the sign of the imaginary part of the argument. In FIG. 3, the conjugation of $\hat{w}$ is carried out by a conjugation circuit 34, and the pointwise multiplication is carried out by a multiplier 35. The set of correlation values $d=\{d_k\}$ is now obtained by inverse Fourier transforming the result of said multiplication:

$d = IFFT(\hat{d})$ which is carried out by an inverse FFT circuit 36. The correlation values $d_k$ are subsequently compared with a given threshold in a threshold circuit 37. The watermark pattern W is detected to be present if one of the correlation values has a significant peak, i.e., larger than the threshold.

Figure 5A:
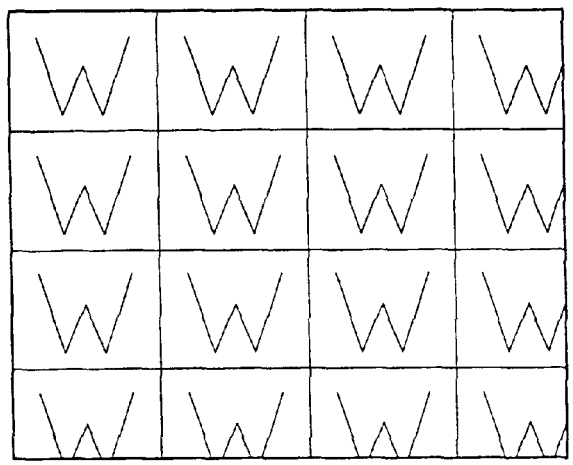
FIGS. 5A–5C show the effects of scaling, rotation and shearing, respectively, on a watermarked image.
Figure 5B:
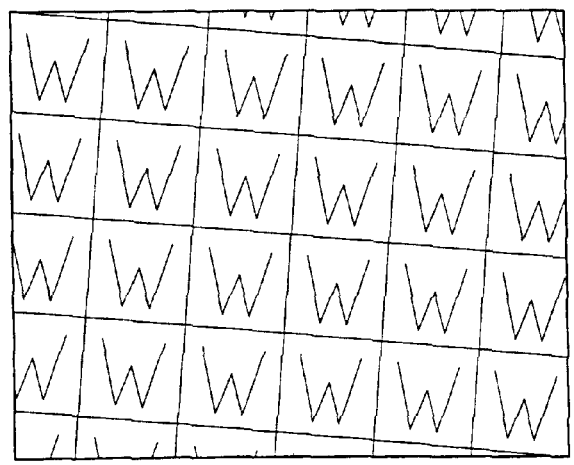
Figure 5C:
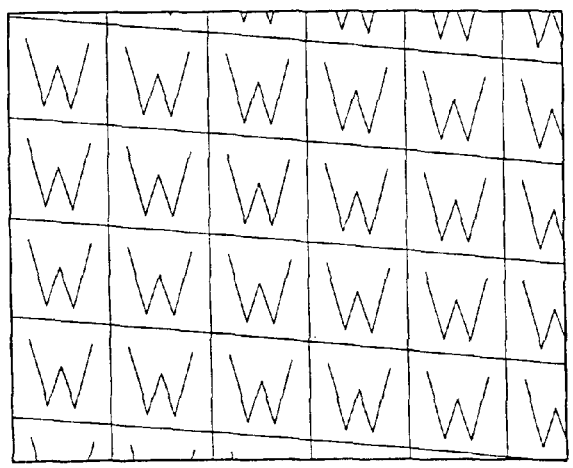

The prior-art detection method lacks performance if the suspect image has been subjected to manipulations that affect the size and/or geometric form of the embedded watermark pattern. Examples of such manipulations are scaling, rotation and stretching (or shearing). Such manipulations, which have the property that straight lines remain straight, parallel lines remain parallel, while, for non-parallel lines the angle may change, are often referred to as affine transforms. FIGS. 5A–5C show the effects of scaling, rotation and shearing, respectively, on the watermarked image shown in FIG. 2. similar as in FIG. 2, the basic watermark patterns are symbolically shown as a clearly visible W. However, each W is a low-amplitude, imperceptible, noisy pattern in practice. It will be appreciated that the correlation between the suspect images shown in FIGS. 5A–5C and the originally embedded watermark (see FIG. 2) has largely been destroyed.

Figure 6:
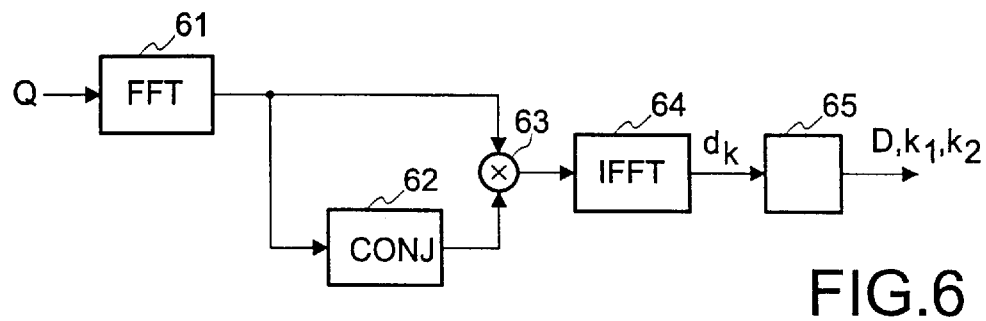
FIG. 6 shows a watermark detector in accordance with the invention.

FIG. 6 shows, schematically, a watermark detector in accordance with the invention. The detector calculates the autocorrelation of the suspect image and determines whether said correlations exhibit a periodic pattern. The embodiment of the watermark detector shown in FIG. 6 calculates the autocorrelation of the suspect image. More in particular, the detector calculates the correlations $$d_k = \frac{1}{N_1 N_2} \sum_{i=1}^{N_1} \sum_{j=1}^{N_2} q_{ij} w_{i+k_x, j+k_y}.$$

between suspect image Q and a shifted version of the same image for all possible shift vectors k ($k_x$ pixels horizontally and $k_y$ pixels vertically). As already described above with reference to FIG. 3, the required calculations can be advantageously carried out by using the (Fast) Fourier Transform. Accordingly, the detector comprises an FFT circuit 61, a conjugation circuit 62, a multiplier 63 for pointwise multiplying the transformed image and the conjugated version thereof, and an inverse FFT circuit 64.

Figure 7A:
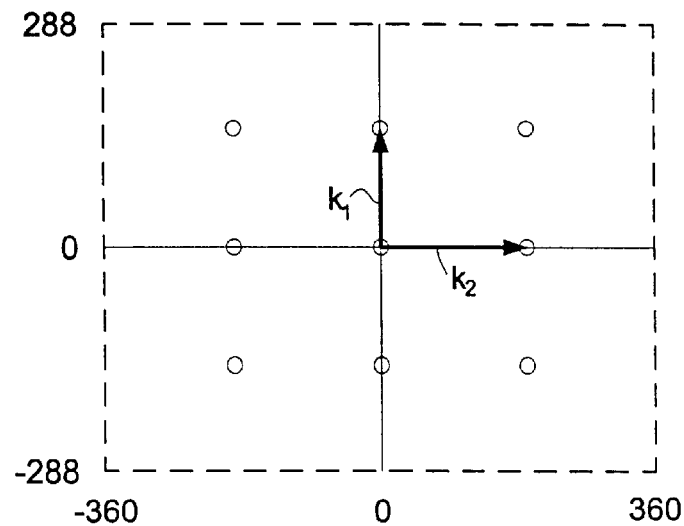
FIGS. 7A–7C show correlation patterns to illustrate the operation of the watermark detector shown in FIG. 6.
Figure 7B:
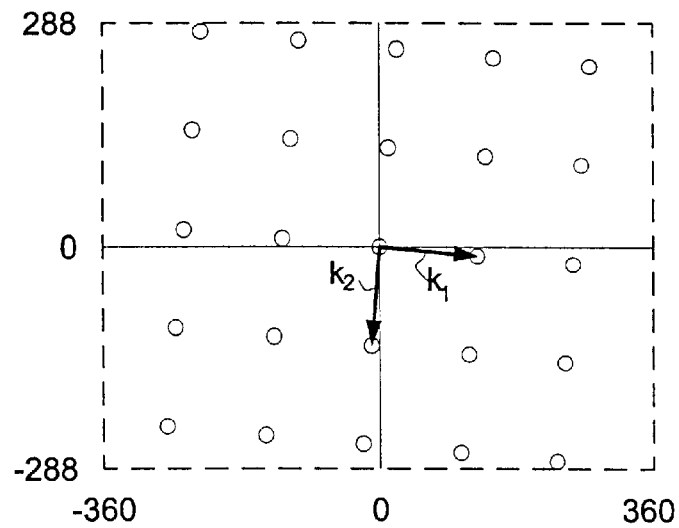
Figure 7C:
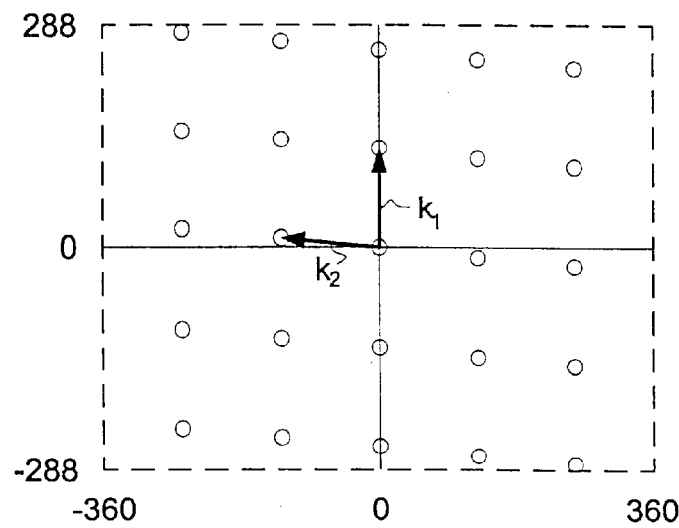

The output of the inverse FFT circuit 64 is an $N_1 \times N_2$ matrix of correlation values $d_k$. The center (0,0) of this matrix represents the correlation for $k_x=0$, $k_y=0$. Said value is extremely large because it represents the correlation between the suspect image and itself. The correlation quickly declines as the shift is larger. However, if the image includes a repeated watermark pattern, the matrix has local peaks at the coordinates for which the watermark patterns in the image and its shifted version coincide. FIGS. 7A–7C show such peak patterns for the manipulated images that are shown in FIGS. 5A–5C, respectively. For completeness, it is be noted that the matrix may also include peaks for shifts $|k_x|>N_1/2$ and $|k_y|>N_2/2$ due to aliasing. These peaks generally have a low value and are not shown in FIGS. 7A–7C.

A peak detection and analysis circuit 65 detects the peaks and analyzes whether the peak pattern exhibits a repetitive pattern. To this end, the circuit determines whether at least a subset of the peaks constitutes a regular pattern. Such analysis algorithms are known in the art. For example, there are mathematical algorithms that search basic vectors with which the periodical peak pattern can be reconstructed through linear combination. Examples of basic vectors thus found are denoted $k_1$, and $k_2$ in FIGS. 7A–7C. If a repetitive peak pattern is found by the mathematical analysis, the circuit 65 outputs a detection signal D to indicate that the suspect image is most likely an image that has been watermarked by means of a tiling operation as explained above. The circuit 65 also outputs the basic vectors $k_1$ and $k_2$ for use by further processing circuits as will be described below.

Figure 8:
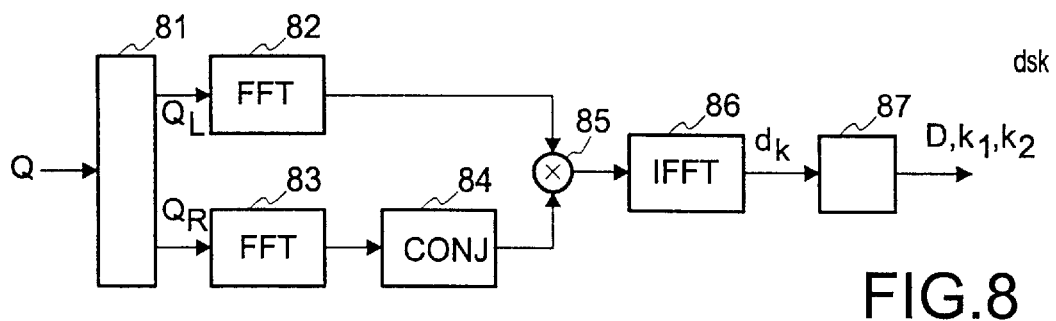
FIGS. 8–10 show further embodiments of a watermark detector in accordance with the invention.

Another embodiment of the watermark detector is shown in FIG. 8. This detector calculates the correlation between different image regions rather than the autocorrelation. The detector comprises an image splitting circuit 81 which divides the image into two regions, for example, a left half $Q_L$ and a right half $Q_R$. A correlation circuit comprising a first FFT circuit 82, a second FFT circuit 83, a conjugation circuit 84, a multiplier 85 and an IFFT circuit 86, calculates the correlation between the two half images in a manner as described above. It generates a peak pattern which has now half the image size. The peak pattern is applied to a peak detection and analysis circuit 87 which operates in a similar manner as peak detection and analysis circuit 65 in FIG. 6. The need for two FFT circuits (82, 83) in FIG. 8 compared with the single FFT circuit (61) in FIG. 6 is largely compensated by reduction of the computational complexity. It will be appreciated that the computational complexity can be further reduced by dividing the image into even more regions.

Figure 9:
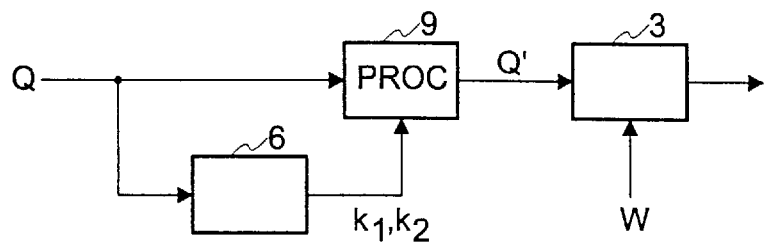

The watermark detectors shown in FIGS. 6 and 8 do not provide information as to whether the embedded watermark is a specific given watermark. A watermark detector which does detect the presence of a given watermark in a possibly manipulated suspect image is shown in FIG. 9. The watermark detector comprises a conventional watermark detection device 3 as described before with reference to FIG. 3. In accordance with the invention, the suspect image Q is now processed by an image processing device 9 before being applied to the conventional detector 3. The task of image processor 9 is to undo the manipulations that the image Q has undergone after the watermark was embedded. To this end, the image processor 9 receives parameters representative of said manipulations from an analysis device 6. The analysis device is a device as described above with reference to FIG. 6 or FIG. 8. The basic vectors $k_1$ and $k_2$ found by the device (see FIGS. 7A–7C) are examples of parameters that are indicative of the periodicity of the basic watermark pattern in image Q. The image processor 9 is arranged to manipulate (scale, rotate, shear or combinations thereof) the image Q in response to said parameters so that the processed image Q' exhibits a given periodicity. More particularly, the suspect image is processed so that the two basic vectors in the processed image are orthogonal with respective lengths $M_1$ and $M_2$ (here 128). Algorithms with which this can be achieved are generally known in the field of image processing.

Figure 10:
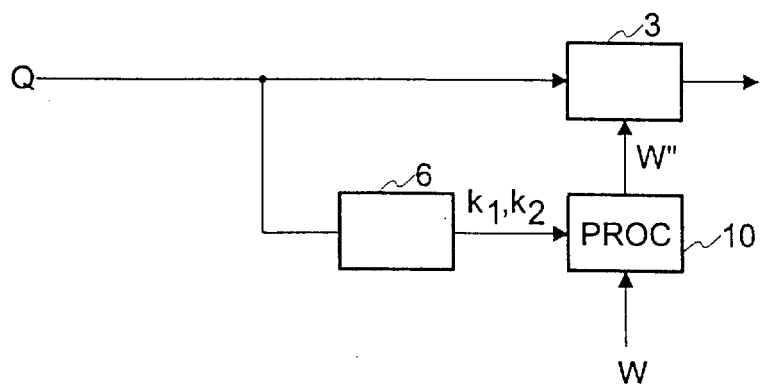
Figure 11:
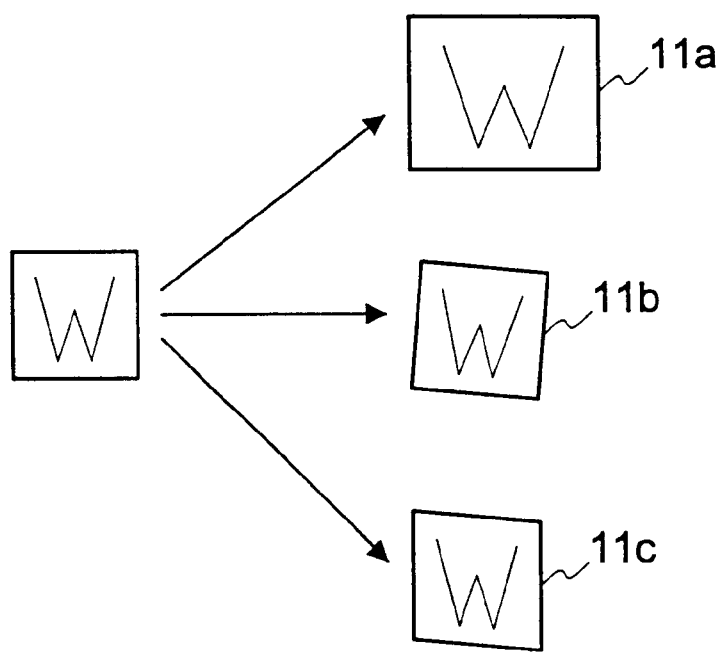
FIG. 11 shows various types of processing applied to a given watermark to illustrate the operation of the watermark detector shown in FIG. 10.

The same result is achieved when the watermark to be detected is subjected to the same manipulations as the suspect image, and the presence of said manipulated watermark pattern in the suspect image is subsequently detected. An embodiment of such a watermark detector is shown in FIG. 10. The manipulation parameters $k_1$, and $k_2$ found by analysis device 6 are now applied to a processing circuit 10 which carries out the same manipulations to the basic watermark pattern W. The 128×128 watermark pattern W is thus transformed into a version W" which corresponds to the pattern in the suspect image. This is illustrated in FIG. 11 which shows a scaled watermark pattern 11a, a rotated watermark pattern 11b and a sheared watermark pattern 11c corresponding to the image manipulations that are shown in FIGS. 5A–5C, respectively.

Figure 12:
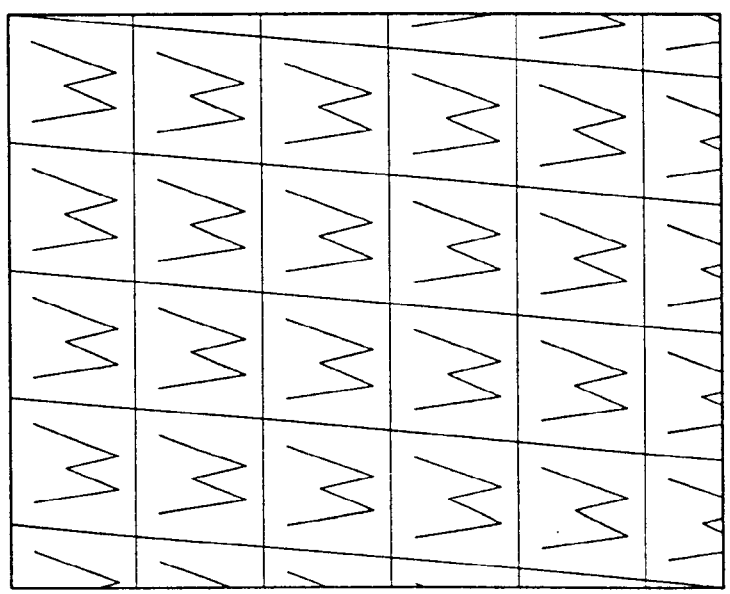
FIG. 12 shows the effect of a combination of manipulations applied to a watermarked image.

A potential problem of the watermark detector shown in FIGS. 9 and 10 is that the processing operation to be carried out by the image processor 9 or 10 is not unambiguously defined by the basic vectors $k_1$, and $k_2$. As an example thereof, FIG. 12 shows the effect of rotating an image through 90° and subsequently shearing the result. The peak pattern found by the analysis device 6, and thus the periodicity, is exactly the same as the periodicity of an image which has only been sheared (cf. FIG. 5C). If the image processor merely undoes the shearing operation, the watermark will not be detected. Fortunately, the number of (combinations of) manipulations that lead to the same peak pattern is limited, and many of them are not used in practice. In view thereof, the processing circuit (9 in FIG. 9, 10 in FIG. 10) in a preferred embodiment of the watermark detector executes a plurality of appropriate candidate inverse manipulations, and the watermark detector 3 detects the presence of the watermark on the basis of the one which gives the highest correlation. Such an embodiment can easily be designed by a skilled person in view of the foregoing description and will therefore not be described in more detail.

The invention is summarized as follows. Most watermarking schemes are not resistant to geometric distortions of a watermarked image, because such manipulations destroy the correlation between the original watermark and the watermark in the manipulated image. A method and arrangement are disclosed that restore the correlation. To this end, a suspect image (Q) is analyzed (6) for the presence of a repeated data pattern. If such a pattern is found, it is concluded that the image has been watermarked by "tiling" a small-sized watermark pattern over the extent of the image. The actual detection of whether the watermark is a given watermark W is subsequently performed by determining the periodicity of the pattern found in the suspect image, and processing (9) the suspect image so as to match the periodicity of the processed image with the given periodicity of the watermark to be detected. If the suspect image indeed includes the given watermark W, the geometric manipulation is thereby undone and a cinventional watermark dector (3) will signify this accordingly. If a combination of operations can generate the same periodicity, the detection step will include the set of possible combinations.

What is claimed is:

1. A method of detecting a watermark in a suspect image, said method comporising the steps:

detecting whether said suspect image includes a periodically repeated embedded data pattern; and concluding that said periodically repeated data pattern represents an embedded watermark, wherein said method further comprises the steps:

determining the periodicity of said data pattern;

applying a given watermark having a given periodicity;

processing the suspect image or the given watermark so as to match the periodicity of the data pattern in the processed suspect image with the periodicity of the processed given watermark; and detecting whether the data pattern in the processed suspect image corresponds to the processed given watermark, and wherein the step of processing the suspect image or the given watermark is repeated for a finite set of predetermined processing operations.

2. The method as claimed in claim 1, wherein the step of processing the suspect image or the given watermark comprises subjecting the suspect image or the given watermark to an affine transform operation.

3. An arrangement for detecting a watermark in a suspect image, said arrangement comprising:

means for detecting whether said suspect image includes a periodically repeated embedded data pattern; and means for concluding that said periodically repeated data pattern represents an embedded watermark, wherein said arrangement further comprises:

means for determining the periodicity of said data pattern;

means for applying a given watermark having a given periodicity;

means for processing the suspect image or the given watermark so as to match the periodicity of the data pattern in the processed suspect image with the periodicity of the processed given watermark; and means for detecting whether the data pattern in the processed suspect image corresponds to the processed given watermark, and wherein the means for processing the suspect image or the given watermark repeatedly performs said processing for a finite set of predetermined processing operations.

4. The arrangement as claimed in claim 3, wherein the means for processing the suspect image or the given watermark subjects the suspect image or the given watermark to an affine transform operation.

\* \* \* \* \*